US010892150B2

(12) United States Patent
Takeshita

(10) Patent No.: US 10,892,150 B2
(45) Date of Patent: Jan. 12, 2021

(54) IMAGING MASS SPECTROMETER

(71) Applicant: SHIMADZU CORPORATION, Kyoto (JP)

(72) Inventor: Kengo Takeshita, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 16/319,967

(22) PCT Filed: Aug. 24, 2016

(86) PCT No.: PCT/JP2016/074601
§ 371 (c)(1),
(2) Date: Jan. 23, 2019

(87) PCT Pub. No.: WO2018/037491
PCT Pub. Date: Mar. 1, 2018

(65) Prior Publication Data
US 2019/0272984 A1 Sep. 5, 2019

(51) Int. Cl.
*H01J 49/16* (2006.01)
*H01J 49/00* (2006.01)
*G01N 27/62* (2006.01)

(52) U.S. Cl.
CPC .......... *H01J 49/0004* (2013.01); *G01N 27/62* (2013.01); *H01J 49/0031* (2013.01);
(Continued)

(58) Field of Classification Search
CPC .... H01J 49/004; H01J 49/0004; H01J 49/164; H01J 49/0031
See application file for complete search history.

(56) References Cited

U.S. PATENT DOCUMENTS 7,655,476 B2 * 2/2010 Bui .................... H01J 49/0004 382/128
2008/0017793 A1 * 1/2008 James ................ H01J 49/0004 250/288
(Continued)

FOREIGN PATENT DOCUMENTS

CA 2 905 318 A1 9/2014
GB 2517005 A 2/2015
(Continued)

OTHER PUBLICATIONS

Communication dated Jul. 23, 2019, from the European Patent Office in counterpart European Application No. 16914165.2.
(Continued)

*Primary Examiner* — Eliza W Osenbaugh-Stewart
(74) *Attorney, Agent, or Firm* — Sughrue Mion, PLLC

(57) ABSTRACT

A region of interest setting unit (41) determines a two-dimensional region of interest on a sample and a plurality of measurement points (small areas) within this region of interest according to a user's specification. A measurement area setting unit (42) sets, near the measurement points within the region of interest, measurement points that do not completely overlap with the measurement points, and sets a measurement area including the plurality of different measurement points. When the user individually sets measurement methods for the region of interest and the measurement area via an input unit (5), a measurement method assignment unit (44) assigns the measurement methods respectively to the regions and records the assignment. An analysis controller (3) executes mass analysis, according to the assigned measurement method, to each of the measurement points within the region of interest and the measurement area, and stores data in a data storage (21).

13 Claims, 6 Drawing Sheets

(52) U.S. Cl.
CPC ........... *H01J 49/164* (2013.01); *H01J 49/004* (2013.01); *H01J 49/0009* (2013.01)

(56) References Cited

U.S. PATENT DOCUMENTS

| | | | | | |
|---|---|---|---|---|---|
| 2011/0127425 | A1* | 6/2011 | Kajihara | H01J 49/0004 | 250/288 |
| 2012/0278037 | A1 | 11/2012 | Matsuura et al. | | |
| 2013/0320203 | A1* | 12/2013 | Roder | H01J 49/40 | 250/282 |
| 2016/0027625 | A1* | 1/2016 | Brown | H01J 49/0004 | 250/282 |
| 2016/0071711 | A1 | 3/2016 | Ikegami | | |
| 2016/0203968 | A1* | 7/2016 | Otsuka | G01B 11/26 | 250/288 |

FOREIGN PATENT DOCUMENTS

| | | | |
|---|---|---|---|
| JP | 2012-237753 | A | 12/2012 |
| JP | 2013-040808 | A | 2/2013 |
| JP | 2016-513797 | A | 5/2016 |
| WO | 2014/140625 | A1 | 9/2014 |
| WO | 2014/175211 | A1 | 10/2014 |

OTHER PUBLICATIONS

Written Opinion for PCT/JP2016/074601, dated Nov. 22, 2016.
International Search Report for PCT/JP2016/074601, dated Nov. 22, 2016.

* cited by examiner

IMAGING MASS SPECTROMETER

This Application is a National Stage of International Application No. PCT/JP2016/074601 filed Aug. 24, 2016.

TECHNICAL FIELD

The present invention relates to an imaging mass spectrometer capable of performing mass analysis to each of a large number of measurement points (small areas) within a two-dimensional area on a sample, and generating an image that shows distribution of substances or the like in the two-dimensional area based on information obtained by the analysis.

BACKGROUND ART

A mass analysis imaging method is a technique for observing distribution of substances having a specific mass-to-charge ratio, by performing mass analysis to each of a plurality of measurement points within a two-dimensional area of a sample such as a sliced piece of biological tissue. Application of the mass analysis imaging method to drug development, biomarker discovery, investigation into causes of various illnesses and diseases has been promoted. A mass spectrometer for performing the mass analysis imaging method is normally referred to as an imaging mass spectrometer (refer to Non Patent Literature 1, Patent Literature 1, and other documents). Since such an imaging mass analysis is typically carried out after observing a two-dimensional area on a sample using an optical microscope and determining an area to be measured based on the optical image of this two-dimensional area, the mass spectrometer for performing the mass analysis imaging method is often referred to as an imaging mass analysis device or a mass microscope. In this description, the mass spectrometer for performing the mass analysis imaging method is referred to as an "imaging mass spectrometer".

In the imaging mass spectrometer, normally, various ionization methods are used for ionizing substances contained in a sample set on a sample stage, by, for example, irradiating the sample with a small focused laser beam, a particle beam such as an electron beam, an ion beam, and an neutral atomic beam, a gas stream containing charged droplets, or a plasma gas stream. The small focus laser beam, particle beam and the like with which the sample is irradiated are often collectively called as a probe or an ionization probe, and herein referred to as an ionization probe. Normally, in such an ionization method, the amount of ions produced by irradiation of a single pulse of the ionization probe to the sample is small. Therefore, in order to enhance the signal intensity of ions to be detected, usually, measurements in each of which one measurement point on the sample is irradiated with the ionization probe to obtain mass spectrum data is repeated many times, and a mass spectrum for the measurement point is obtained by integrating the mass spectrum data of the measurements.

The ionization methods described above are, irrespective of the ionization mechanism which depend on the type of the ionization probe, basically a destructive analysis, because ionization is carried out by taking out a target component within a sample. Therefore, repeating irradiation with the ionization probe, that is, measurement to the same measurement point reduces the amount of the target component within the sample at the measurement point, thus reduces quality of mass spectrum. In particular, because, in case of a matrix-assisted laser desorption/ionization (MALDI) method, irradiating a sample with a laser beam consumes not only target components within the sample, but also matrix added to the sample to assist ionization, deterioration in the quality of mass spectrum by repeating measurement to the same measurement point is noticeable. Considering that, normally, upper limits of the number of repetition of measurements on the same measurement point (the total number of irradiation with an ionization probe) and of total irradiation time with the ionization probe are previously set so that deterioration in quality of obtained mass spectrum falls within an acceptable range, and analysis conditions including the number and time duration of irradiation with an ionization probe per measurement point are set so as not to exceed the upper limits.

In normal mass spectrometers, especially when a sample containing unknown components in unknown amounts is measured, it is necessary to perform tuning of various parameters to optimal values by preliminary measurement in order to obtain as high signal intensity as possible; the parameter values including ionization conditions (e.g., laser beam power and a number of times of laser beam pulse irradiation, in the case of the MALDI method), MS analysis conditions such as an application voltage to an ion transport optical system, and $MS^n$ analysis conditions such as a collision energy and a collision gas pressure in collision-induced dissociation. The so-called tuning of the measurement method as described above is also important for the imaging mass spectrometer.

In the measurement of the imaging mass spectrometer, normally, components contained in a sample vary according to measurement positions on the sample, and a region of interest (ROI) on the sample to be observed differs for each user. Therefore, it is desirable to perform tuning of the measurement method by performing preliminary measurement on the region of interest on the sample that the user desires to observe while changing the parameter values such as ionization conditions. However, since it is necessary to repeat measurement by a large number of times in order to properly perform tuning of the measurement method, sample components and matrix are consumed as the measurement is repeated. Therefore, it is common to perform preliminary measurement on a region different from the region of interest on the sample, and to perform tuning of the measurement method based on the result. However, this poses a problem that proper tuning is difficult to perform since the object components are not necessarily the same as those contained in the region of interest.

It is possible instead to conduct the measurement by allotting a number of times of measurement for each of measurement methods with different parameter values so as not to exceed an upper limit value of a total number of times of measurement for each measurement point within the region of interest, and performing the measurement to each measurement point within the region of interest using a plurality of measurement methods. This is a technique in which measurement using a single measurement method by a number of times N/p or smaller is carried out to each measurement point, where N is the upper limit value of the total number of times of the measurement for each measurement point, and p is the number of the measurement methods. However, with this technique, a number of times of measurement for each measurement method is small, and an obtained signal intensity tends to be low. Therefore, it is difficult to properly compare mass spectra under different measurement methods. In particular, with the MALDI method, since the variation in signal intensity for each measurement is relatively large, an influence of variation in signal intensity for measurement becomes noticeable if a number of times of measurement for each measurement method is small, accuracy in tuning of the measurement method is lowered. Further, since the upper limit value of the total number of times of the measurement for each measurement point is determined, a number of the measurement methods that can be set is also limited, and it is adversely not possible to finely change a parameter value of one analysis condition.

Other than a case in which the tuning of the measurement method is performed, there is a case in which it is desired to perform measurement using a plurality of measurement methods to each of measurement points within a region of interest. Examples of such a case include a case in which it is desired to collect a larger amount of mass analysis information from one region of interest or to compare results of the measurement by performing a plurality of mass analyses of different mass-to-charge ratio ranges, a normal mass analysis and an $MS^n$ analysis, or a plurality of $MS^n$ analyses of different mass-to-charge ratios of precursor ions to each of measurement points within a region of interest. In such cases, similarly to the case of the tuning of the measurement methods, it is possible to conduct the measurement by allotting a number of times of measurement for a plurality of measurement methods with different analysis conditions so as not to exceed an upper limit value of a total number of times of measurement for each measurement point within the region of interest. However, as described above, since the number of times of measurement for each measurement method is small, obtained signal intensity tends to be low, and it is difficult to obtain correct mass analysis information.

CITATION LIST

Patent Literature

Patent Literature 1: WO 2014/175211 A

Non Patent Literature

Non Patent Literature 1: “iMScope TRIO imaging mass microscope”, [online], Shimadzu Corporation, [searched on Aug. 8, 2016], Internet

SUMMARY OF INVENTION

Technical Problem

The present invention has been made in view of the above problems, and a main object of the present invention is to provide an imaging mass spectrometer capable of performing measurement of different measurement methods by a number of times of measurement with which a sufficient signal intensity is obtained near a region of interest on a sample that a user desires to observe, and obtaining a high quality mass analysis image under the different measurement methods.

Solution to Problem

To solve the above problems, the present invention provides an imaging mass spectrometer capable of executing mass analysis to a plurality of small areas set within a two-dimensional area on a sample by irradiating the small areas with an ionization probe, the imaging mass spectrometer including:

a) a region of interest setting unit configured to set a region of interest on a sample and a plurality of small areas positioned discretely within the region of interest;

b) a measurement area setting unit configured to set one or more measurement areas that partially overlap with the region of interest, and a plurality of small areas positioned discretely within each of the measurement areas and positioned so as not to completely overlap with the plurality of small areas within the region of interest and a plurality of small areas within other measurement areas;

c) a measurement method setting unit configured to set, to each of the region of interest and the one or more measurement areas, or to each of the plurality of measurement areas, a measurement method including an analysis condition for executing mass analysis; and d) an analysis execution unit configured to execute mass analysis to the plurality of small areas included in each of the region of interest and the one or more measurement areas, or to each of the plurality of small areas included in the plurality of measurement areas, the mass analysis being executed according to the measurement method set to each of the region of interest and the measurement areas by the measurement method setting unit.

In the imaging mass spectrometer according to the present invention, examples of the ionization probe include a small focused laser beam, a particle beam such as an electron beam, an ion beam, and a neutral atomic beam, a gas stream containing charged droplets, or a plasma gas stream. When a laser beam is used as the ionization probe, examples of the ionization methods include, in addition to the MALDI method described above, a laser desorption/ionization (LDI) method without using matrix, and a surface-assisted laser desorption/ionization (SALDI) method.

In the imaging mass spectrometer according to the present invention, for example, when a user specifies a region of interest in which the user desires to observe spatial distribution of components on the sample, and specifies spatial resolution and a size of one small area (measurement point), that is, an irradiation diameter of the ionization probe, the region of interest setting unit sets the region of interest in which the plurality of small areas are discretely positioned, on the sample, according to the specification. With the imaging mass spectrometer capable of obtaining an optical image of the sample, the user may specify the region of interest referring to the optical image that is displayed. Further, the region of interest may be automatically specified by image recognition or the like according to a predetermined condition.

For example, when the region of interest, and parameters such as spatial resolution and a number of pixels of the mass analysis image are specified, a size and a position of each of rectangular small regions obtained by dividing the region of interest in mesh and each corresponding to a pixel of the mass analysis image are determined. Therefore, a small area having the specified size specified as one of the parameters by the user as one parameter may be set at a center position of each of the small regions. Here, parameters such as the spatial resolution and the size of the small area may be default values predetermined for the device, instead of being specified by the user.

After the region of interest and the small areas within the region of interest are set, the measurement area selling unit sets different small areas respectively corresponding to the small areas within the region of interest at positions that do not completely overlap, that is, positions that do not overlap at all or partially overlap but not completely, with a plurality of small areas within the region of interest, and set a measurement area that partially overlaps with the region of interest and includes the plurality of different small areas. The size and direction of displacement between the positions of the small areas within the region of interest and the respective small areas within the measurement area may be set by the user, or may be automatically determined according to the size of the small areas within the region of interest or intervals between adjacent areas, for example. In any case, the measurement area is set to a position displaced from a position of the region of interest as needed. Here, more than one measurement area may be provided as needed. In this case, small areas within one measurement area are positioned so as not completely overlap with small areas within another measurement area.

The measurement method setting unit individually sets, to each of the region of interest and the one or more measurement areas, or to each of the plurality of measurement areas, the measurement method including an analysis condition for executing mass analysis. Here, the analysis conditions may include various parameter values that should be set in order to execute the mass analysis, and when an ion source based on the MALDI method is mounted, for example, power and a number of times of laser beam pulse irradiation of the laser beam with which the sample is irradiated may be included in the measurement method. Further, if ions are passed from the ion transport optical system of a previous stage to the ion transport optical system of a subsequent stage by switching a value of voltage (amplitude value of the AC voltage) applied to each component of the mass spectrometer such as an ion transport optical system, a frequency when AC voltage is applied, and a voltage applied to the ion transport optical system of a previous stage and the ion transport optical system of a subsequent stage, timing (such as time difference) of switching of the voltages may also be included in the measurement method. Further, when $MS^n$ analysis is employed as the mass analysis, $MS^n$ analysis conditions such as a mass-to-charge ratio value of the precursor ions, a collision energy, and a collision gas pressure in collision-induced dissociation may also be included in the measurement method. Here, while the measurement method may be individually set to the region of interest and the measurement area, contents of the individual measurement method do not matter and may be completely the same.

The analysis execution unit executes the mass analysis to each of the plurality of small areas included in the region of interest and the one or more measurement areas according to the measurement method individually set to the corresponding region, and thus obtains mass spectrum data for each of the small areas. Here, as described above, by integrating mass spectrum data obtained by irradiating one small area with the ionization probe by one or more times, it is possible to obtain mass spectrum data for the one small area.

Typically, the measurement area is set displaced from the region of interest on the sample by a distance of only several multiples of the irradiation diameter of the ionization probe. Therefore, while it depends on the sample, in many cases, spatial distribution of components within the measurement area is considered to be substantially the same as spatial distribution of components within the region of interest. On the other hand, since the small areas within the measurement area and the small areas within the region of interest are not completely overlapped, even in a case in which the mass analysis is executed to the small areas within the measurement area after the mass analysis is executed to the small areas within the region of interest, a possibility that target components (including matrix, in the case of MALDI method) remain within a range for irradiating the ionization probe on the sample is high. Therefore, it is possible to obtain mass spectrum data with sufficient signal intensity. Accordingly, by setting different values for the parameter of the measurement method individually set to the region of interest and the one or more measurement area, or the measurement method individually set to the plurality of measurement areas, that is, by setting the measurement methods having different content, it is possible to obtain mass spectrum data with substantially the same quality as in a case in which the mass analysis is executed using a different measurement method to one region of interest.

Owing to this process, it is possible to compare mass analysis images at a specific mass-to-charge ratio at high accuracy for region of interest under different measurement methods, or to obtain distribution information of a plurality of components that may be detected with sufficient intensity only under different measurement methods.

The parameter values as the analysis conditions included in the measurement method may be individually input by the user. However, if tuning of the measurement method is intended, it is desirable to reduce time and effort of the user required to generate measurement methods having different values of a parameter that is desired to be optimized.

Therefore, in the imaging mass spectrometer according to the present invention, preferably, the measurement method setting unit generates, according to a condition for changing a value of a parameter as at least one analysis condition included in a measurement method, a plurality of measurement methods having different values of the parameter, and sets the plurality of measurement methods to each of the region of interest and the one or more measurement areas, or to each of the plurality of measurement areas.

Here, examples of the condition for changing the value of the parameter as one analysis condition include a range for changing the value of the parameter (an upper limit value and a lower limit value) and a step width of the change. It is also possible that the value of the parameter changes with an increased step width as the value increases, instead of changing the value of the parameter by a constant step width, for example.

According to this configuration, a plurality of measurement methods having different values of the parameter are automatically generated only by specifying the condition for changing the value of the parameter that is desired to be optimized, the user need not manually generate measurement methods, and it is possible to save time and effort of the user and improve efficiency of analysis.

The imaging mass spectrometer having the above configuration may further include an optimal measurement method determination unit configured to, based on a mass analysis result obtained by the mass analysis to small areas included in different measurement areas under a plurality of different measurement methods, determine an optimal measurement method out of the plurality of measurement methods.

Various algorithms may be possible to determine an optimal measurement method, and as one example, it is possible to employ a method in which a total TIC value is obtained by adding TIC values for all of the small areas in the region of interest and the measurement areas, and in which one of the measurement methods set for the region of interest and the measurement areas whose total TIC value is largest is set as the optimal measurement method. Further, it is possible to determine the optimal measurement method using data for only of a specific part of the small areas, instead of using data for all of the small areas within the region of interest and the measurement areas. Moreover, it is possible to determine the optimal measurement method using specific mass-to-charge ratio values and signal intensity values within a mass-to-charge ratio range, instead of the TIC values.

As described above, in many cases, the spatial distribution of the components within the measurement area may be considered to be substantially the same as the spatial distribution of the components within the region of interest, and in any of the small areas in any of the measurement areas, an influence by consumption of the sample components and the matrix by execution of previous analysis is small. Therefore, it is possible to obtain mass spectrum data with sufficient signal intensity. It is possible to satisfactorily compare mass analysis results in different measurement areas, and to properly select the optimal measurement method.

The imaging mass spectrometer having the above configuration may further include a measurement method condition setting unit configured to allow a user to specify the condition for changing the value of the parameter as the at least one analysis condition included in the measurement method.

According to the above configuration, depending on a type of the sample, a purpose of the analysis, or required accuracy and reliability of the analysis, the user may specify the condition for changing the parameter value s needed. With this, it is possible to perform appropriate tuning of the measurement method according to the purpose and situation including cases in which it is desired to reduce time for analysis even if the tuning of the measurement method is rough, and in which it is desired to improve accuracy of the tuning of the measurement method even if time for analysis increases.

The imaging mass spectrometer according to the present invention may further include:

a precursor ion selecting unit configured to select precursor ions for $MS^n$ analysis (where n is an integer equal to or greater than 2), based on an $MS^{n-1}$ analysis result obtained by $MS^{n-1}$ analysis to the small areas included in the region of interest, in which the measurement method setting unit sets, to each of one or more measurement areas, a measurement method including an analysis condition for executing the $MS^n$ analysis targeting one or more precursor ions selected by the precursor ion selecting unit, and the analysis execution unit executes, as the mass analysis to the plurality of small areas included in the one or more measurement areas, the $MS^n$ analysis according to the measurement method set to each of the measurement areas.

According to the above configuration, it is possible to execute $MS^n$ analysis targeting different precursor ions to different measurement areas whose spatial distribution of the components may be considered to be substantially the same as the spatial distribution of the components within the region of interest. Therefore, it is possible to compare $MS^n$ images obtained from different precursor ions easily and accurately. Here, it is desirable that a precursor ion selection condition for the $MS^n$ analysis may be specified by the user.

The imaging mass spectrometer according to the present invention can generate a mass analysis image based on a mass analysis result obtained by the mass analysis to the small areas included in the region of interest or the measurement areas and to display the generated mass analysis image, and may further include an imaging unit configured to obtain an optical image of the sample; and an image superimposition processor configured to display mass analysis image generated based on a mass analysis result obtained by the mass analysis to the small areas included in the region of interest or the measurement areas, and the optical image for the region of interest or the measurement areas obtained by the imaging unit, in a superimposed manner.

According to the above configuration, it is possible to easily comprehend relation between a shape and a pattern of a biological tissue observed on the sample and component distribution. Here, with the image superimposition processor, it should be appreciated that the mass analysis image for the measurement area may be superimposed on an optical image for the same measurement area. However, since positional displacement between the region of interest and the measurement area is small, there is substantially no problem even if the mass analysis image for the measurement area and the optical image for the region of interest are superimposed.

Advantageous Effects of Invention

According to the imaging mass spectrometer according to the present invention, it is possible to execute the mass analysis, under the different measurement methods, to the region of interest on the sample that the user desires to observe, and the measurement area that is substantially at the same position as the region of interest and in which the small areas that are irradiated with the ionization probe do not completely overlap with the small areas within the region of interest, or the plurality of measurement areas that are substantially at the same position as the region of interest. Owing to this configuration, it is possible to obtain high-quality mass analysis images for the region of interest respectively under the different measurement methods. Further, it is possible to perform accurate optimization of the measurement method using favorable mass analysis information obtained under the different measurement methods, or to obtain high-quality $MS^n$ images having different precursor ions by the automatic $MS^n$ analysis.

DESCRIPTION OF EMBODIMENTS

Hereinafter, one embodiment of an imaging mass spectrometer according to the present invention will be described with reference to the appended drawings.

Figure 1:
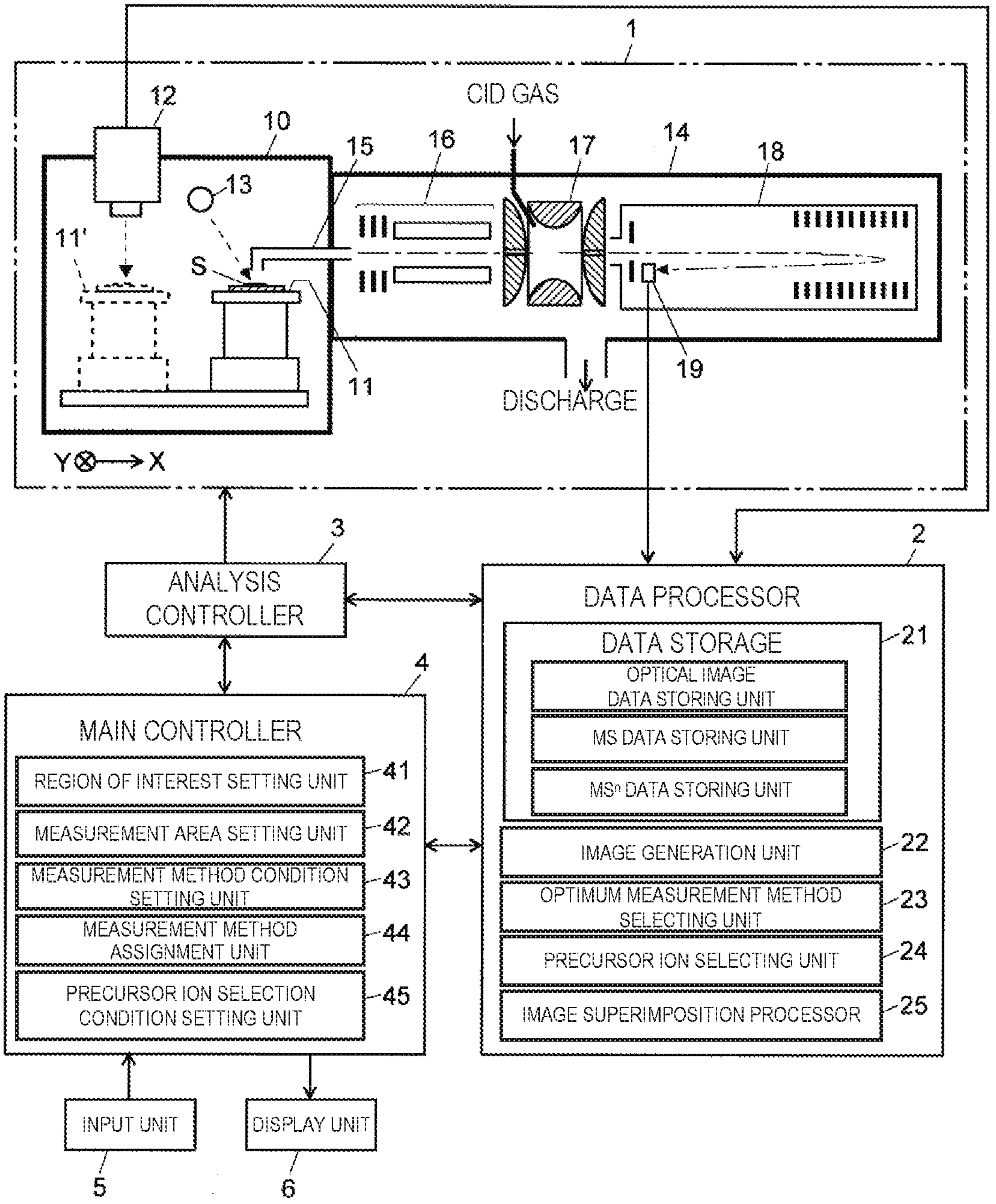
FIG. 1 is a general configurational diagram of an imaging mass spectrometer according to one embodiment of the present invention.

FIG. 1 is a general configurational diagram of the imaging mass spectrometer according to this embodiment.

The imaging mass spectrometer according to this embodiment includes: a measurement unit 1 capable of executing mass analysis to a large number of measurement points (small areas) within a two-dimensional area on a sample S, and obtaining mass spectrum data (including $MS^n$ spectrum data where n is 2 or greater) for each measurement point; a data processor 2 configured to store and process the data obtained by the measurement unit 1; an analysis controller 3 configured to control operations of components included in the measurement unit 1; a main controller 4 that controls an entire system and an user interface; and an input unit 5 and a display unit 6 attached to the main controller 4.

The measurement unit 1 is a MALDI ionization ion trap time-of-flight mass spectrometer (MALDI-IT-TOFMS) capable of performing $MS^n$ analysis. Specifically, the measurement unit 1 includes: a sample stage 11 positioned within an ionization chamber 10 in atmospheric pressure atmosphere and movable in two directions along an X axis and a Y axis that are at right angles to each other; an imaging unit 12 that takes an optical image of the sample S placed on the sample stage 11 when the sample stage 11 is at a position indicated by a reference number 11' in FIG. 1 (hereinafter referred to as an "optical observation position"); a laser light emitter 13 that irradiates the sample S with a finely focused laser beam to ionize components within the sample S when the sample stage 11 is at a position indicated by a solid line in FIG. 1 (hereinafter referred to as an "analysis position"); an ion introduction unit 15 that collects ions produced from the sample S and transfers the collected ions to a vacuum chamber 14 which is maintained at vacuum atmosphere; an ion guide 16 that converges and guides the ions produced from the sample S; an ion trap 17 that temporarily traps ions with a high-frequency quadrupolar electrical field and conducts selection and dissociation (collision-induced dissociation=CID) of precursor ions as needed; a flight tube 18 that forms a flight space within the tube for separating ions ejected from the ion trap 17 according to a mass-to-charge ratio; and a detector 19 that detects ions. However, as described later, the configuration of the measurement unit 1 is not limited to the above configuration, and various modifications may be made.

The data processor 2 includes a data storage 21, an image generation unit 22, an optimum measurement method selecting unit 23, a precursor ion selecting unit 24, and an image superimposition processor 25, as functional blocks characteristic of the imaging mass spectrometer according to this embodiment. The data storage 21 stores various data obtained by the measurement unit 1, and includes an optical image data storing unit, an MS data storing unit, and an $MS^n$ data storing unit. The main controller 4 includes functional blocks such as a region of interest setting unit 41, a measurement area setting unit 42, a measurement method condition setting unit 43, a measurement method assignment unit 44, a precursor ion selection condition setting unit 45, as functional blocks characteristic of the imaging mass spectrometer according to this embodiment. Here, at least a part of the data processor 2, the main controller 4, and the analysis controller 3 may be configured such that their functions are realized by causing dedicated control/processing software installed in a personal computer (or workstation with higher performance) having a CPU, a RAM, a ROM, and the like as a hardware resource to run on the computer.

The imaging mass spectrometer according to this embodiment irradiates the sample S placed on the sample stage 11 with the finely focused laser beam ejected from the laser light emitter 13 when measurement is executed. Then, components present at a portion (measurement point) of the sample S that is irradiated with the laser beam are ionized. As the sample stage 11 is moved in an X axis direction and a Y axis direction as needed using a drive unit that is not shown, the portion of the sample S that is irradiated with the laser beam changes. By repeating movement of the sample stage 11 and irradiation of the pulsed laser beam, it is possible to execute mass analysis to a plurality of measurement points within the two-dimensional area on the sample S.

The imaging mass spectrometer according to this embodiment can perform several characteristic measurement operations, as well as normal measurement as described above. In the following description, these measurement operations will be described with reference to FIGS. 2A and 2B to FIG. 6.

[Measurement to Region of Interest Under Plurality of Measurement Methods]

Figure 4:
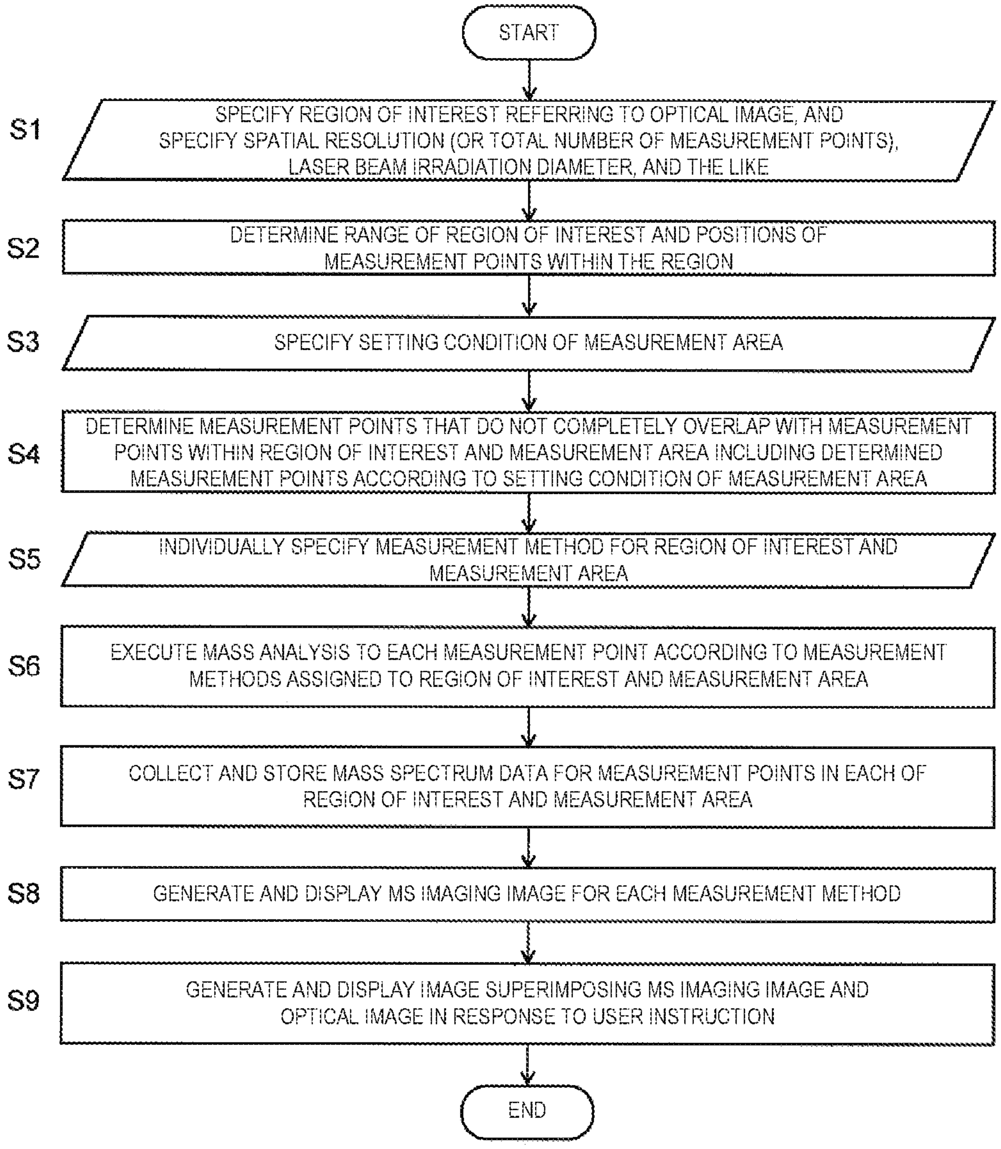
FIG. 4 is a flowchart showing an operation and procedures in data collection under a plurality of measurement methods for the imaging mass spectrometer according to this embodiment.

FIG. 4 is a flowchart showing an operation and procedures in a first characteristic measurement operation for the imaging mass spectrometer according to this embodiment.

A sample to be measured is placed on a sample plate for MALDI, and the sample S is prepared by applying (or spraying) an appropriate matrix on a surface of the sample. Examples of the sample to be measured include a sliced piece of biological tissue. A user (analyst) sets the sample S that has been prepared on the sample stage 11, and performs a predetermined operation using the input unit 5. Then, under control of the analysis controller 3 receiving an instruction from the main controller 4, the sample stage 11 is moved to the optical observation position, and the imaging unit 12 obtains an optical image of the sample S and sends image data of the image to the data processor 2. The image data is stored in the data storage 21. Further, the optical image of the sample S based on the image data is displaced on a screen of the display unit 6 via the main controller 4.

The user refers the optical image displayed on the display unit 6, and specifies a region of interest, on the sample 5, that is desired to be observed using the input unit 5 (step S1). For example, by changing a size and a position of a rectangular frame that encloses an arbitrary range on the optical image, it is possible to specify the range enclosed by the frame as a region of interest. Further, it is possible to specify a region of interest of an arbitrary shape by performing dragging operation on the optical image.

In order to determine a measurement point within the specified region of interest at which mass analysis is actually executed, the user specifies parameter values such as a laser beam irradiation diameter, spatial resolution (for example, intervals between the measurement points in the X axis direction and the Y axis direction) and a total number of measurement points through the input unit 5 (step S1). It should be noted that the specification by the user may be omitted when default values that are previously set for the device are used as the parameter values. In the main controller 4, upon instruction from the input unit 5, the region of interest setting unit 41 determines a range of the region of interest, and positions of a plurality of measurement points within the region of interest to which laser beam irradiation is performed (step S2).

Figure 2A:
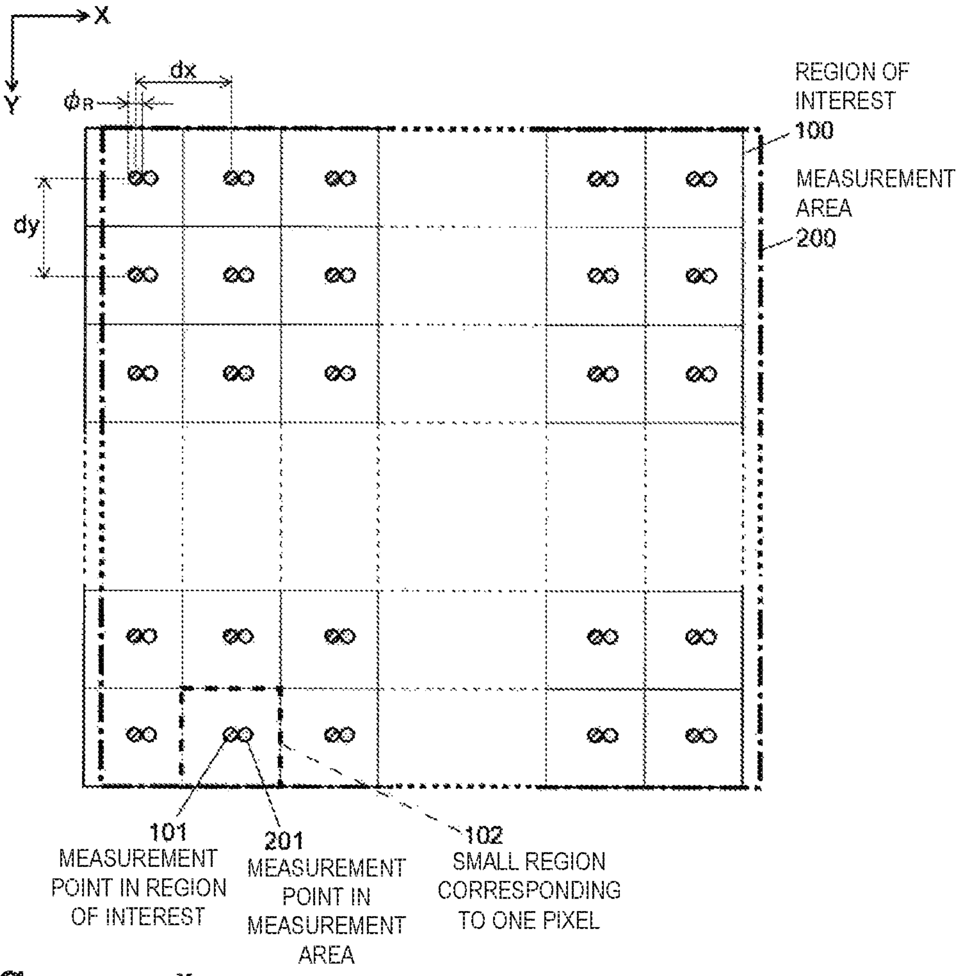
FIGS. 2A and 2B are illustrative diagrams showing one example of relation between a region of interest and a measurement area of the imaging mass spectrometer of this embodiment.
Figure 2B:
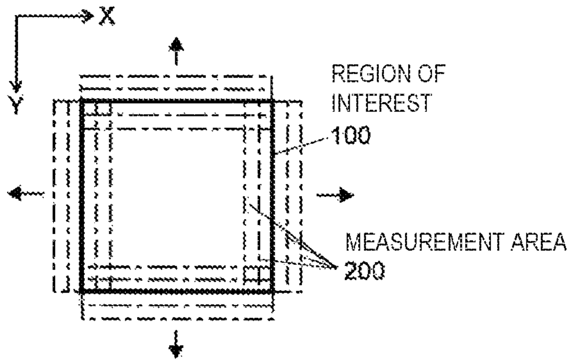
Figure 3:
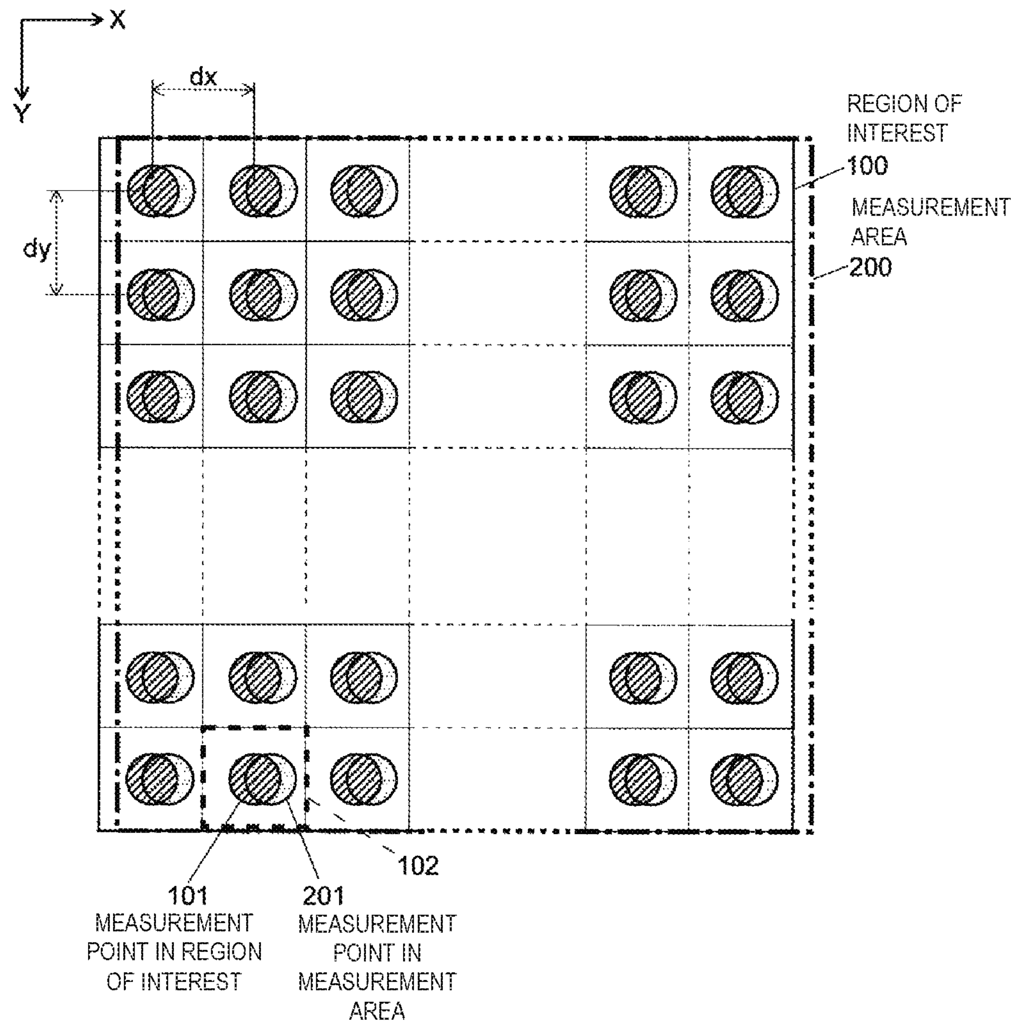
FIG. 3 is an illustrative diagram showing another example of the relation between the region of interest and the measurement area of the imaging mass spectrometer of this embodiment.

FIG. 2A and FIG. 3 are illustrative diagrams showing examples of relation between the region of interest and the measurement area. Here, when the region of interest is rectangular, and in a case where a laser beam irradiation diameter $\phi_R$, an X axis direction measurement point interval dx, and a Y axis direction measurement point interval dy are specified, as shown in FIG. 2A, measurement points 101 each having a diameter $\phi_R$ is set at a position at which an interval in the X axis direction is dx, and an interval in the Y axis direction is dy within a region of interest 100. Each of the measurement points 101 is set to be positioned at a center of each of small regions 102, which are obtained by dividing the region of interest 100 having a rectangular shape as a whole into rectangles whose X axis direction is dx and Y axis direction is dy. In the example shown in FIG. 2A, a size of the measurement points 101 is smaller than a size of the small regions 102. However, when the specified laser beam irradiation diameter is large, the relation between the small regions 102 and the measurement points 101 is as shown in FIG. 3, for example. Here, the plurality of measurement points 101 set for the region of interest 100 are referred to as a first measurement point group, for convenience sake.

The user specifies a newly set measurement area for the region of interest 100 and a setting condition for measurement points within this area via the input unit 5 (step S3). Specifically, for example, the user may specify, as setting conditions, an amount and a direction to displace each of the measurement points (measurement points of the first measurement point group) 101 within the region of interest 100, or a number of measurement points that are newly set between the measurement points 101 adjacent in the X axis direction or the Y axis direction. Here, it is desirable to set restriction that a range by which each of the measurement points 101 within the region of interest 100 may be displaced is positioned within a range of the small region 102 in which the corresponding measurement point 101 is present. It should be noted that the amount and the direction to displace a measurement point from the position of the original measurement point (that is, within the region of interest 100) when the measurement area is determined may be automatically determined based on the size of the measurement point or intervals within the region of interest 100. In this case, specification of the setting conditions by the user may be omitted.

The measurement area setting unit 42 determines different measurement points that do not completely overlap with the measurement points within the region of interest and a measurement area 200 that encloses the different measurement points, according to the selling conditions specified in step S3 (step S4). FIG. 2A shows an example for newly setting measurement points 201 within the measurement area 200 by displacing the measurement points 101 within the region of interest 100 by $\phi_R$ in a positive X axis direction (rightward). The measurement area 200 is also displaced by $\phi_R$ in the positive X axis direction with respect to the region of interest 100. By restricting the range by which each of the measurement points 101 within the region of interest 100 may be displaced to the range of the small region 102 in which the corresponding measurement point 101 is present as described above, the newly set measurement area 200 is set such that the major part of the area overlaps with the region of interest 100 (refer to FIG. 2B).

In the case of FIG. 2A, the measurement points 101 within the region of interest 100 do not overlap with the measurement points within the measurement area 200 at all. On the other hand, if the laser beam irradiation diameter, that is, the measurement point 101, is large, it may be difficult (or impossible) to set the measurement points 201 within the newly set measurement area 200 so as not to overlap with the respective measurement points 101 within the region of interest 100. FIG. 3 shows an example of such a case, and the measurement points 101 within the region of interest 100 partially overlap with the respective measurement points 201 within the newly set measurement area 200. While it is preferable that the measurement points 201 within the measurement area 200 do not overlap with the measurement points 101 within the region of interest 100 at all as shown in FIG. 2A, it is acceptable that those points partially overlap with each other as shown in FIG. 3.

Next, the user specifies measurement methods respectively to the region of interest and the measurement area via the input unit 5 (step S5). Each of the measurement methods includes various parameter values including an ionization condition such as laser beam power, and an analysis condition such as an application voltage to components such as the ion guide 16. The specification of the measurement methods may be performed by selecting file names of measurement method files previously storing various parameter values. While different measurement methods are normally specified to the region of interest and the measurement area, it is possible to specify the same measurement method. According to the specification by the user, the measurement method assignment unit 44 records assignment of the measurement methods respectively to the region of interest and the measurement area.

It should be noted that the operations and the procedures in steps S1 to S5 may be interchanged as needed. For example, the measurement methods to the region of interest and the measurement area may be first are specified, and then the region of interest and the measurement area may be set. Further, it is possible to specify after setting the region of interest, the measurement method to this region of interest, and then to specify the measurement area and the measurement method to this measurement area.

Upon instruction of start of the analysis by the user via the input unit 5, the analysis controller 3 controls the measurement unit 1 to execute the mass analysis to the measurement points 101 within the region of interest 100 according to the measurement method assigned to this region of interest 100, and then to execute the mass analysis to the measurement points 201 within the measurement area 200 according to the measurement method assigned to this measurement area 200. Owing to this process, the mass analysis is executed to each of the measurement points 101 and 201 (step S6).

In the measurement unit 1, when the measurement points 101 (or 201) on the sample S are irradiated with a pulsed laser beam using the laser light emitter 13 for MALDI, components in the sample S near the irradiation site are ionized. The generated ions are transferred into the vacuum chamber 14 via the ion introduction unit 15, converged and guided by the ion guide 16 into the ion trap 17, and temporarily held by action of a quadrupolar electrical field. The various ions are ejected from the ion trap 17 at a predetermined timing, introduced into a flight space within the flight tube 18, and reach the detector 19 after flying through the flight space. During the flight in the flight space, the various ions are separated according to their mass-to-charge ratios, and an ion with a smaller mass-to-charge ratio reaches the detector 19 faster. An analog detection signal detected by the detector 19 is converted into a digital data by an analog-to-digital converter that is not shown, and input to the data processor 2, and then the flight time is converted into a mass-to-charge ratio and stored as mass spectrum data in the data storage 21.

After the mass spectrum data for one measurement point within the region of interest 100 or the measurement area 200 is stored in the data storage 21 in this manner, the sample stage 11 is moved such that a measurement point to be next measured comes to the laser beam irradiation position. By repeating the above operation, mass spectrum data for all of the measurement points 101 and 201 within the region of interest 100 and the measurement area 200 are collected (step S7). In steps S6 and S7, the mass analysis to one of the measurement points 101 within the region of interest 100 and the mass analysis to one of the measurement points 201 within the measurement area 200 may be executed alternately, or after executing the mass analysis to all of the measurement points 101 (or the measurement points 201) within the region of interest 100 (or within the measurement area 200), the mass analysis to all of the measurement points 201 (or the measurement points 101) of the measurement area 200 (or within the region of interest 100) may be executed.

After the data collection, based on the date stored in the data storage 21, the image generation unit 22 generates an MS image indicating two-dimensional distribution of signal intensity at the mass-to-charge ratios specified to the region of interest 100 and the measurement area 200, and displays the generated image on the display unit 6 via the main controller 4 (step S8).

Since components of the sample S and matrix flee when the sample S is irradiated with a laser beam, obtained signal intensity gradually decreases every time the same position of the sample S is irradiated with a laser beam. By contrast, since the measurement points 101 within the region of interest 100 and the measurement points 201 within the measurement area 200 do not completely overlap, when the mass analysis is executed to the measurement points 201 within the measurement area 200 after the mass analysis is executed to the measurement points 101 within the region of interest 100, a part that is not irradiated with a laser beam is irradiated with at legit a part of a laser beam in the mass analysis to the region of interest 100. This also applies to the case as shown in FIG. 3 in which the measurement points 101 within the region of interest 100 and the measurement points 201 within the measurement area 200 partially overlap with each other, as well as to the case as shown in FIG. 2A in which the measurement points 101 within the region of interest 100 do not overlap the measurement points 201 within the measurement area 200 at all. Therefore, it is possible to obtain signals with sufficient intensity, even when the mass analysis is executed to the measurement area 200 under a measurement method different from that used in the mass analysis to the region of interest 100.

While the measurement area 200 is not at the position of the region of interest 100 that is specified by the user, the measurement area 200 overlaps with the region of interest 100 to an extent in which the measurement area 200 is at a position that may be considered to be substantially the same as position of the region of interest 100 on the sample S. Accordingly, components present in the measurement points 101 within the region of interest 100 and in the measurement points 201 may be considered to be substantially the same. Therefore, for example, when different measurement methods are set to the region of interest 100 and the measurement area 200, it can be considered that only a difference of the measurement methods are reflected on the MS image for the region of interest 100 and the MS image for the measurement area 200 at the same mass-to-charge ratio, and it is possible to collect more information from the MS images about the region of interest 100 on the sample S. Further, by adding, subtracting, or dividing the signal intensity of the pixels of the MS images, or by selecting signal intensity having a larger value in intensity, it is possible to generate an MS image more accurately indicating two-dimensional distribution of specific components in the region of interest 100. Moreover, it is possible to discuss the accuracy of the measurement methods by comparing the MS images.

When the user performs a predetermined operation via the input unit 5 as needed, the image superimposition processor 25 obtains the optical image data stored in the data storage 21, superimposes an MS image at an arbitrary mass-to-charge ratio (or a combination of the plurality of mass-to-charge ratios) for the region of interest 100 or the measurement area 200 with an optical image of the same region, and display the superimposed image on the display unit 6 (step S9). Such superimposition of the images may be performed by a drag-and-drop operation of moving the optical image over the MS image on a screen on which both of the MS image and the optical image are displayed, for example. As described above, the measurement area 200 may be considered to be substantially at the same position as the region of interest 100. Therefore, it is possible to superimpose an optical image that correspond to the region of interest directly over the MS image for the measurement area 200 (that is, without displacing by displacement between the positions of the region of interest and the measurement area). Displaying the MS image and the optical image in the overlapping manner provides an advantage that visual correspondence between the shape and the pattern of the biological tissue shown on the optical image and the two-dimensional distribution of the components is facilitated.

While only one measurement area 200 is determined for the region of interest 100 in the above description, it is possible to determine a plurality of measurement areas 200. In this case, similarly to the relation between the measurement points 101 within the region of interest 100 and the measurement points 201 within the measurement area 200 described above, the measurement points 201 included in the different the measurement areas 200 are set to positions that are not completely overlapped with each other. When the mass analysis is executed to one of the measurement areas 200, a portion on the sample S to which the analysis is not executed is irradiated with at least a part of the laser beam. Further, particularly when the plurality of measurement areas 200 are to be set, a number of the measurement areas may be set according to a number of the measurement methods specified before specification of the measurement areas 200.

[Automatic Tuning of Measurement Method]

Figure 5:
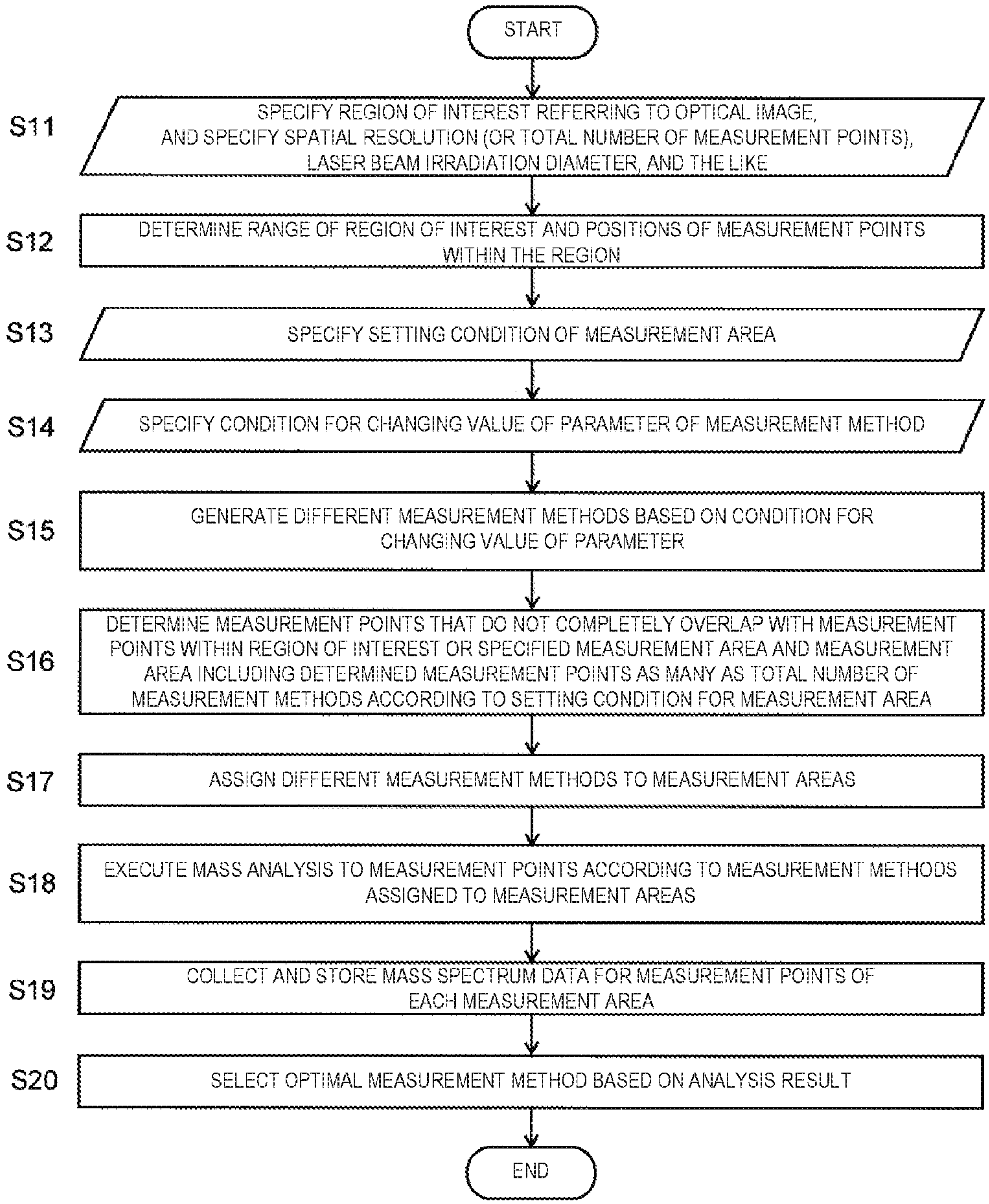
FIG. 5 is a flowchart showing an operation and procedures in measurement method tuning for the imaging mass spectrometer according to this embodiment.

FIG. 5 is a flowchart showing an operation and procedures of a second characteristic measurement operation for the imaging mass spectrometer according to this embodiment. The measurement operation is an operation of automatic tuning for automatically optimizing the measurement methods.

In FIG. 5, operations and procedures in steps S11 to S13 are the same as the operations and procedures in steps S1 to S3 described above, and descriptions for these steps are omitted. After step S13 ends, the user specifies, via the input unit 5, a condition for changing parameter values of various analysis conditions in the measurement method (step S14).

For example, when a parameter value such as an application voltage to the ion guide 16 is to be optimized, a range for changing the value of the parameter (that is, an upper limit value and a lower limit value) and a step width of the change may be specified as the changing conditions. Further, if the step width is not constant, the changing conditions may be specified using a calculation formula for parameter values or a parameter value table. Moreover, as described above, since more than one analysis condition is included in the measurement method, a parameter value of one of the analysis conditions may affect a parameter value of another analysis condition. Therefore, the plurality of parameter values may be changed in a multidimensional manner. Further, the user may select only types of the analysis conditions to be optimized (e.g., laser beam power, the number of times of laser beam irradiation, an application voltage of the ion guide 16, a frequency of a high-frequency voltage to be applied to the ion guide 16, timing at which a voltage for trapping ions is applied to the ion trap 17), and the conditions for changing the parameter values may be determined as default. Moreover, all of the conditions may be determined as default without specification of the user.

Next, the measurement method condition setting unit 43 generates different measurement methods respectively based on the conditions for changing the parameter values of the measurement methods (step S15). The larger the number of analysis conditions by which the parameter value should be changed and the number of step widths of the parameter value, the larger the number of the generated measurement methods.

By the same procedures as in step S4, the measurement area setting unit 42 sets the measurement area 200 as many as the number of measurement methods generated in step S15, the measurement area 200 including the measurement points 201 that do not completely overlap with the measurement points 101 within the region of interest 100 and that do not completely overlap with measurement points 201 within a different measurement area 200 (step S16). Here, the number of the measurement areas 200 other than the region of interest 100 and the number of the measurement methods are set to be identical, in order to perform the mass analysis to the measurement points 101 within the region of interest 100 using the measurement method that is finally optimized. The measurement method assignment unit 44 assigns the different measurement method respectively to the plurality of set measurement areas 200 and records the assignment (step S17).

When the user instructs to start executing the automatic tuning via the input unit 5, the analysis controller 3 controls the measurement unit 1 to execute the mass analysis to the measurement points 201 within one of the measurement areas 200 according to the measurement method assigned to this measurement area 200, and then to execute the mass analysis to the measurement points 201 within another one of the measurement areas 200 according to the measurement method assigned to this measurement area 200. By repeating the above operation, the mass analysis to the measurement points 201 within all of the measurement areas 200 is executed (step S18). The data storage 21 temporarily stores mass spectrum data collected in this manner (step S19).

The optimum measurement method selecting unit 23 selects an optimal measurement method among the plurality of measurement methods, based on data obtained for each of the measurement areas 200 (step S20).

For example, a total ion current (TIC) value obtained by adding signal intensity of all of the mass-to-charge ratios is obtained for each of the measurement points 201 within one of the measurement areas 200, and then a total TIC value obtained by adding the TIC values for all of the measurement points within the measurement area 200 is calculated. The total TIC values for the different measurement areas 200 obtained under the different measurement methods are compared, and one of the measurement methods whose total TIC value is maximum is selected as the optimal measurement method. Further, when a target component is determined, one of the measurement methods whose additional value of signal intensity of a mass-to-charge ratio of ions from target component is maximum may be selected as the optimal measurement method. Examples of the algorithm for selecting the optimal measurement method out of the plurality of measurement methods are not limited to the above.

After the optimal measurement method is selected in the above manner, the mass analysis to the measurement points 101 within the region of interest 100 may be executed under the optimal measurement method, and mass spectrum data to the region of interest 100 may be collected.

In the above description, the plurality of measurement methods are generated according to the condition for changing the parameter value specified in step S14, the number of the measurement areas corresponding to the generated measurement methods are set, and then the mass analysis is executed. However, the mass analysis may be executed every time one measurement method and one measurement area are set, and the procedures may be terminated based on a mass analysis result at a time point at which a measurement method estimated to be optimal is found. As described above, by setting the measurement method and the measurement area, executing the mass analysis, and executing determination of the optimal measurement method in a sequential manner, it is possible to avoid unnecessary execution of mass analysis.

[Automatic $MS^n$ Analysis]

Figure 6:
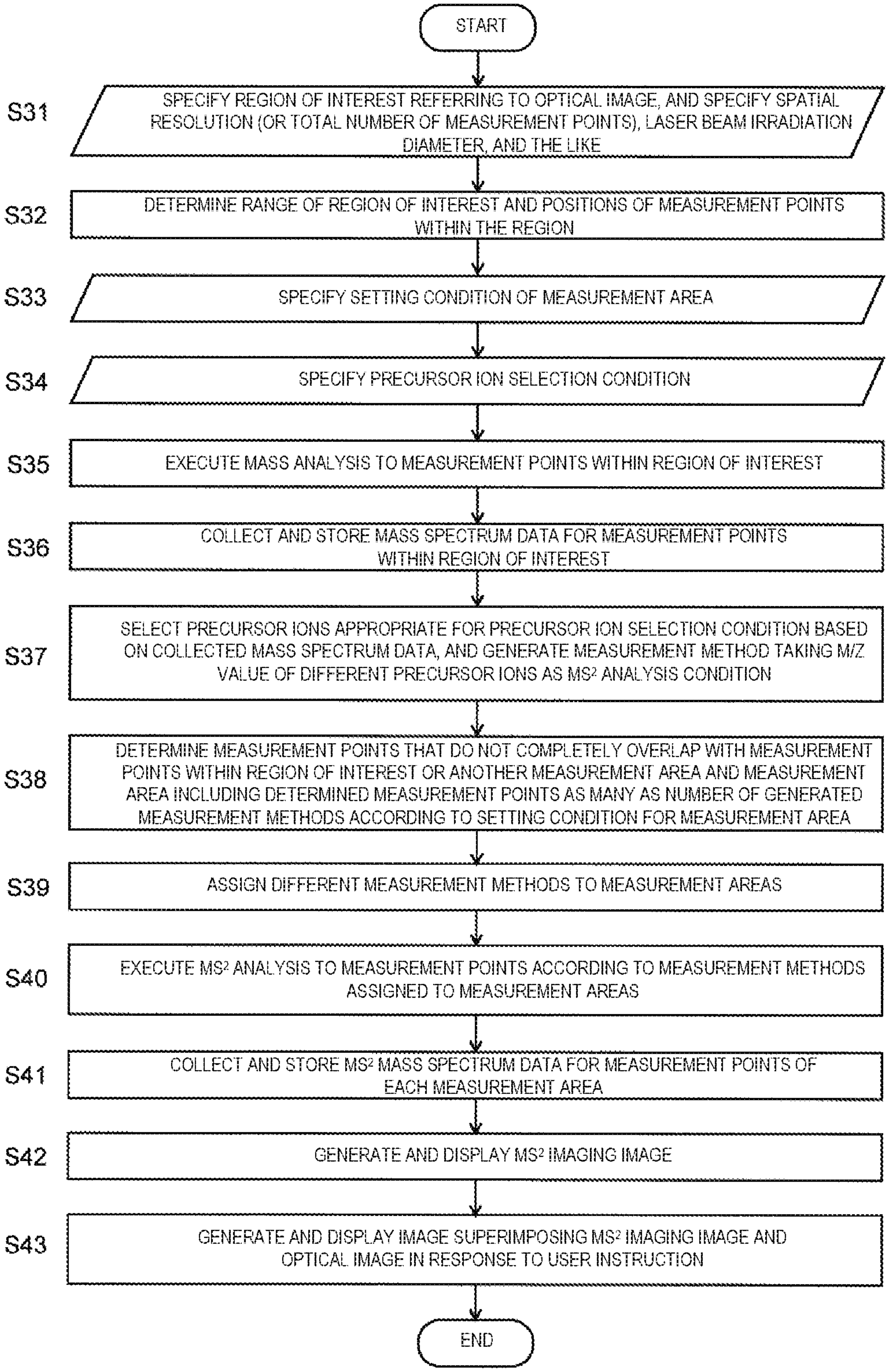
FIG. 6 is a flowchart showing an operation and procedures in execution of an automatic $MS^n$ analysis for the imaging mass spectrometer according to this embodiment.

FIG. 6 is a flowchart showing a third characteristic measurement operation for the imaging mass spectrometer according to this embodiment. The measurement operation is an operation of automatic $MS^n$ analysis for automatically selecting precursor ions based on the normal mass analysis result and executing $MS^n$ is 2, in this embodiment).

In FIG. 6, operations and procedures in steps S31 to S33 are the same as the operations and procedures in steps S1 to S3 described above, and descriptions for these steps are omitted. After the procedure in step S33 ends, in response to the user's input via the input unit 5, the precursor ion selection condition setting unit 45 sets a selection condition for precursor ions and records the set selection condition (step S34). Examples of the precursor ion selection condition include selection of results obtained by the mass analysis in order to select the precursor ions. Specifically, it is possible to select one of mass spectrum data obtained for a specific one of the measurement points 101 within the region of interest 100, a value obtained by integrating or by averaging mass spectrum data obtained for a plurality of specific measurement points, and a value obtained by integrating or by averaging mass spectrum data obtained for all of the measurement points 101 within the region of interest 100 to be used, in order to perform determination of precursor ion selection. Further, examples of the determination condition of precursor ion selection to be specified include selecting a predetermined number of peaks in order of magnitudes of signal intensity in the mass spectrum, selecting a predetermined number of peaks whose signal intensity is a predetermined value or greater in order of mass-to-charge ratio values, and a predetermined number of peaks when there is a peak having a predetermined mass-to-charge ratio value.

When the user instructs to start executing the automatic $MS^n$ analysis via the input unit 5, the analysis controller 3 controls the measurement unit 1 to execute the mass analysis to the measurement points 101 within the region of interest 100 according to the predetermined measurement method. The mass analysis to the measurement points 101 within the region of interest 100 is executed, and the data storage 21 temporarily stores mass spectrum data collected in this manner (steps S35 and S36). Here, when it is selected that mass spectrum data only for a specific one of or the plurality of measurement points is used for determination as the precursor ion selection condition, the mass analysis may be executed only to the specific one of or the plurality of measurement points 101, instead of executing the mass analysis to all of the measurement points 101.

After the data collection, according to the set precursor ion selection condition, the precursor ion selecting unit 24 selects one of or a plurality of peaks as precursor ions based on the obtained mass spectrum data and obtains a mass-to-charge ratio value for the peak (step S37). It should be noted that there is a case in which no peak is present that matches precursor ion selection condition. In this case, the procedure ends without executing the $MS^2$ analysis. When one of or a plurality of precursor ions are selected, by the same procedures as in step S4, the measurement area setting unit 42 sets the measurement area 200 as many as the number of the precursor ions selected in step S37, the measurement area 200 including the measurement points 201 that do not completely overlap with the measurement points 101 within the region of interest 100 and that do not completely overlap with measurement points 201 within a different measurement area 200 (step S38). Further, the measurement method assignment unit 44 generates the measurement methods for the $MS^2$ analysis targeting the selected precursor ions, and assigns the generated measurement methods respectively to the measurement areas 200 set in step S38 (step S39).

When the measurement method and the measurement area are determined, the analysis controller 3 controls the measurement unit 1 to execute the $MS^2$ analysis according to the set measurement method, that is, the $MS^2$ analysis targeting one of the precursor ions selected in step S37, to the measurement points 201 within one of the measurement areas 200. Specifically, with the measurement unit 1, after various ions generated by the sample S being irradiated with a laser beam are trapped in the ion trap 17, ions other than ions having a mass-to-charge ratio of the precursor ions are discharged from the ion trap 17. Subsequently, a collision gas is introduced into the ion trap 17 and the ions are excited, and thus promoting dissociation of ions. Then, product ions generated by the dissociation are ejected from the ion trap 17 to the flight tube 18 at once and subjected to the mass analysis.

In this manner, the $MS^2$ analysis targeting the same precursor ions is executed to the measurement points 201 within one of the measurement areas 200, and the data storage 21 temporarily stores $MS^2$ spectrum data collected in this manner. By repeating the above operation, the $MS^2$ analysis to the measurement points 201 within all of the measurement areas 200 set in step S38 is executed, and the data storage 21 stores mass spectrum data collected in this manner (steps S40 and S41).

After the data collection, based on the $MS^2$ spectrum data stored in the data storage 21, the image generation unit 22 generates an $MS^2$ image showing distribution of two-dimensional intensity of product ions having a specific mass-to-charge ratio from the specified precursor ions, and displays the generated image on the display unit 6 via the main controller 4 (step S42). As described above the measurement area 200 may be considered to be substantially the same as the region of interest 100. Accordingly, $MS^2$ images corresponding to the different precursor ions are considered to show distribution of components within the region of interest 100, and it is possible to visually compare distribution of two-dimensional intensity of the product ions from the different precursor ions in an accurate manner.

When the user performs a predetermined operation via the input unit 5 as needed, the image superimposition processor 25 obtains the optical image data stored in the data storage 21, superimposes the optical image of the measurement area over the $MS^2$ image for an arbitrary measurement area, and displays the superimposed image on the display unit 6 (step S43).

In the ion trap 17, it is possible to execute $MS^n$ analysis where n is 3 or greater, in addition to the $MS^2$ analysis. Therefore, automatic $MS^n$ analysis where n is 3 or greater may be also executed according to the same procedures. Further, it is possible to display an image on the display unit 6 so that comparison between an $MS^3$ image and a $MS^4$ image is possible.

In the imaging mass spectrometer according to the above embodiment, the ion source is an MALDI ion source. However, the ion source may be an ion source based on a LDI method or a SALDI method. Further, the ion source may use the ionization probe such as an electron beam, an ion beam, a neutral atomic beam, a gas stream, a plasma gas stream, or the like, other than the laser beam. Specifically, any technique may be employed, as long as the sample is irradiated with a small focused ionization probe, and ionization for sample components within a range irradiated with this ionization probe is performed.

The configuration of the measurement unit 1 other than the ion source, that is, the configurations of the mass analysis device for separating the ions according to the mass-to-charge ratio and the ion dissociation unit for dissociating the ions are not limited to the examples described above. For example, when the $MS^n$ analysis is performed, the measurement unit 1 is not limited to an ion trap time-of-flight mass spectrometer, and may be any of an ion trapping mass spectrometer, a tandem quadrupole mass spectrometer, and a Q-TOF mass spectrometer. Further, in this case, the technique of an ion dissociation operation for the $MS^n$ analysis is not limited to the collision-induced dissociation, and may be any of infrared multi-photon absorption/dissociation, electron capture dissociation, electron transfer dissociation, and the like.

The embodiment is one example of the present invention, and it is evident that any modification, alteration, or addition made as needed within the scope of the spirit of the present invention is included within the scope of the claims by the present invention.

REFERENCE SIGNS LIST

1 . . . Measurement Unit
10 . . . Ionization Chamber
11 (11') . . . Sample Stage
12 . . . Imaging Unit
13 . . . Laser Light Emitter For MALDI
14 . . . Vacuum Chamber
15 . . . Ion Introduction Unit
16 . . . Ion Guide
17 . . . Ion Trap
18 . . . Flight Tube
19 . . . Detector
2 . . . Data Processor
21 . . . Data Storage
22 . . . Image Generation Unit
23 . . . Optimum Measurement Method Selecting Unit
24 . . . Precursor Ion Selecting Unit
25 . . . Image Superimposition Processor
3 . . . Analysis Controller
4 . . . Main Controller
41 . . . Region Of interest Setting Unit
42 . . . Measurement Area Setting Unit

43 . . . Measurement Method Condition Setting Unit
44 . . . Measurement Method Assignment Unit
45 . . . Precursor Ion Selection Condition Setting Unit
5 . . . Input Unit
6 . . . Display Unit
S . . . Sample

The invention claimed is:

1. An imaging mass spectrometer capable of executing mass analysis of a two-dimensional area on a sample by irradiating a plurality of first measurement points with an ionization probe, the imaging mass spectrometer comprising:

a processor configured to:

a) set a region of interest on the sample and define a first plurality of measurement points positioned discretely within the region of interest;

b) set one or more measurement areas that partially overlap with the region of interest, and define a second plurality of measurement points positioned discretely within each of the measurement areas, the second plurality of measurement points positioned so as not to completely overlap with the first plurality of measurement points or with measurement points within other measurement areas, wherein the second plurality of measurement points are set by displacing the first plurality of measurement points;

c) set, to each of the region of interest and the one or more measurement areas, or to each of the measurement areas, a measurement method including an analysis condition for executing the mass analysis; and d) execute the mass analysis to the first plurality of measurement points and the second plurality of measurement points, the mass analysis being executed according to the measurement method set to each of the region of interest and the measurement areas by the measurement method setting unit.

2. The imaging mass spectrometer according to claim 1, wherein the processor is further configured to:

generate, according to a condition for changing a value of a parameter as at least one analysis condition included in the measurement method, a plurality of measurement methods having different values of the parameter, and sets the plurality of measurement methods to each of the region of interest and the one or more measurement areas, or to each of the measurement areas.

3. The imaging mass spectrometer according to claim 2, wherein the processor is further configured to:

based on a mass analysis result obtained by the mass analysis to the second plurality of measurement points included in different measurement areas under the plurality of measurement methods, determine an optimal measurement method out of the plurality of measurement methods.

4. The imaging mass spectrometer according to claim 3, wherein the processor is further configured to:

allow a user to specify the condition for changing the value of the parameter as the at least one analysis condition included in the measurement method.

5. The imaging mass spectrometer according to claim 4, further comprising:

an imaging device configured to obtain an optical image of the sample; and an image superimposition processor configured to display a mass analysis image generated based on a mass analysis result obtained by the mass analysis to the first plurality of measurement points included in the region of interest or the second plurality of measurement points included in the one or more measurement areas, and the optical image for the region of interest or the one or more measurement areas obtained by the imaging device, in a superimposed manner.

6. The imaging mass spectrometer according to claim 3, further comprising:

an imaging device configured to obtain an optical image of the sample; and an image superimposition processor configured to display a mass analysis image generated based on a mass analysis result obtained by the mass analysis to the first plurality of measurement points included in the region of interest or the second plurality of measurement points included in the one or more measurement areas, and the optical image for the region of interest or the one or more measurement areas obtained by the imaging device, in a superimposed manner.

7. The imaging mass spectrometer according to claim 2, wherein the processor is further configured to:

allow a user to specify the condition for changing the value of the parameter as the at least one analysis condition included in the measurement method.

8. The imaging mass spectrometer according to claim 7, further comprising:

an imaging device configured to obtain an optical image of the sample; and an image superimposition processor configured to display a mass analysis image generated based on a mass analysis result obtained by the mass analysis to the first plurality of measurement points included in the region of interest or the second plurality of measurement points included in the one or measurement areas, and the optical image for the region of interest or the measurement areas obtained by the imaging device, in a superimposed manner.

9. The imaging mass spectrometer according to claim 2, further comprising:

an imaging device configured to obtain an optical image of the sample; and an image superimposition processor configured to display a mass analysis image generated based on a mass analysis result obtained by the mass analysis to the first plurality of measurement points included in the region of interest or the second plurality of measurement points included in the one or more measurement areas, and the optical image for the region of interest or the one or more measurement areas obtained by the imaging device, in a superimposed manner.

10. The imaging mass spectrometer according to claim 1, wherein the processor is further configured to:

select precursor ions for $MS^n$ analysis (where n is an integer equal to or greater than 2), based on an $MS^{n-1}$ analysis result obtained by $MS^{n-1}$ analysis to the measurement points included in the region of interest, wherein set, to each of the one or more measurement areas, a measurement method including an analysis condition for executing the $MS^n$ analysis targeting the selected precursor ions, and execute, as the mass analysis to the second plurality of measurement points included in the one or more measurement areas, the $MS^n$ analysis according to the measurement method set to each of the one or more measurement areas.

11. The imaging mass spectrometer according to claim 1, further comprising:

an imaging device configured to obtain an optical image of the sample; and an image superimposition processor configured to display a mass analysis image generated based on a mass analysis result obtained by the mass analysis to the first plurality of measurement points included in the region of interest or the second plurality of measurement points included in the one or more measurement areas, and the optical image for the region of interest or the one or more measurement areas obtained by the imaging device, in a superimposed manner.

12. The imaging mass spectrometer according to claim 10, further comprising:

an imaging device configured to obtain an optical image of the sample; and an image superimposition processor configured to display a mass analysis image generated based on a mass analysis result obtained by the mass analysis to the first plurality of measurement points included in the region of interest or the second plurality of measurement points included in the one or more measurement areas, and the optical image for the region of interest or the one or more measurement areas obtained by the imaging device, in a superimposed manner.

13. The imaging mass spectrometer according to claim 1, wherein the second plurality of measurement points within the measurement area are set by specifying a number of measurement points which are set between the first plurality of measurement points adjacent in a predetermined direction within the region of interest.

* * * * *